(12) United States Patent
Van Barneveld

(10) Patent No.: US 6,254,654 B1
(45) Date of Patent: Jul. 3, 2001

(54) SOIL IMPROVER COMPOSITION AND PLANT GROWTH ENHANCER

(76) Inventor: Dirk Van Barneveld, 75 Victoria Road, Potts Point, New South Wales, 2011 (AU)

( * ) Notice: Subject to any disclaimer, the term of this patent is extended or adjusted under 35 U.S.C. 154(b) by 0 days.

(21) Appl. No.: 09/397,644

(22) Filed: Sep. 16, 1999

(51) Int. Cl.$^7$ ............... A01G 7/00; C05F 1/00; C05F 3/00; C05F 11/00; C05F 11/08

(52) U.S. Cl. ............ 71/8; 47/9; 47/DIG. 10; 71/9; 71/10; 71/11; 71/17; 71/19; 71/20; 71/21; 71/22; 71/23; 71/64.06; 71/64.1; 71/903; 405/264

(58) Field of Search ............... 71/11, 22, 23, 71/32, 37, 39, 64.06, 64.1, 17, 19, 8, 9, 10, 903, 20, 21; 405/264; 47/9, DIG. 10

(56) References Cited

U.S. PATENT DOCUMENTS

| | | | |
|---|---|---|---|
| 1,320,701 | * 11/1919 | Manns . | |
| 3,785,797 | * 1/1974 | Strelzoff et al. | 71/39 |
| 3,966,641 | * 6/1976 | Csatar et al. | 252/449 |
| 4,575,391 | * 3/1986 | DeBoodt et al. | 71/28 |
| 5,093,262 | 3/1992 | Kimura | 435/290 |
| 5,238,480 | 8/1993 | Rehberg et al. | 71/28 |
| 5,451,240 | 9/1995 | Trowbridge | 71/24 |
| 5,578,486 | 11/1996 | Zhang | 435/243 |
| 5,605,557 | 2/1997 | Hall | 71/62 |
| 5,741,346 | 4/1998 | Glover | 71/15 |
| 5,741,750 | * 4/1998 | Hall | 502/200 |

FOREIGN PATENT DOCUMENTS

| | | | |
|---|---|---|---|
| 81716/94 | 4/1995 | (AU) | C05G/3/00 |
| 81717/94 | 5/1995 | (AU) . | |
| 81667/94 | 6/1995 | (AU) | C09K/17/02 |
| 81667/94 | 7/1995 | (AU) . | |
| 3409019A | 3/1984 | (DE) | C05F/9/00 |
| 3640785C1 | 4/1988 | (DE) | C05D/9/00 |
| 296 18 816 U | 10/1996 | (DE) | C05G/1/00 |
| 55-137186 | 10/1980 | (JP) | C09K/17/00 |
| 5078187 | 9/1991 | (JP) | C05D/9/02 |
| 07118636A | 5/1995 | (JP) | C09K/17/40 |
| 11035388 | * 2/1999 | (JP) . | |
| WO 96/31449 | 10/1996 | (WO) | C05F/11/02 |

OTHER PUBLICATIONS

Gillman, G.P., "The Effect of Crushed Basalt Scoria on the Cation Exchange Properties of a Highly Weathered Soil", Soil Science Society of America Journal, vol. 44, No. 3, May–Jun. 1980, pp. 465–468.

* cited by examiner

*Primary Examiner*—Wayne Langel
(74) *Attorney, Agent, or Firm*—Sughrue, Mion, Zinn, Macpeak & Seas, PLLC

(57) ABSTRACT

A soil improver composition produced by digesting a mixture comprising leguminous plant material, igneous rock powder of particle size less than 350 microns, a biodegradable surfactant and water with composting microbes to produce said soil improver composition.

29 Claims, 1 Drawing Sheet

SOIL IMPROVER COMPOSITION AND PLANT GROWTH ENHANCER

FIELD OF THE INVENTION

The present invention relates to soil improver compositions and methods for producing same. In particular, the invention relates to compositions which are suitable for use as soil conditioners, ameliorants, fertilizers, plant growth enhancers, compost, potting mix or mulch. The invention also relates to methods for producing said compositions.

BACKGROUND OF THE INVENTION

Soil improver compositions such as conditioners, ameliorants and fertilizers are used to increase crop yields per hectare and to make unsuitable soils capable of supporting crops that otherwise would not have been viable.

The continued increase in crop yields and the farming of marginal soils and land has been possible by expanding and improving irrigation systems, by protecting crops from disease, insects and the competition of weeds, and by the development of new varieties of plants. An important method of improving crop yields has been achieved through the application of increasing amounts of chemical fertilizers.

The utility of chemical fertilizers is their source of nitrogen, phosphorous and potassium (NPK), and other minerals and micronutrients, in forms which are accessible to uptake by plants. Nitrogen, for example, is required in all protein, and is the most important of all plant nutrients. Nitrogenous fertilizers are often derived from ammonia, a by-product from natural gas, and whilst hazardous, gaseous ammonia can be applied under pressure to fields or more commonly ammonia is converted into urea for use as a fertilizer.

The constant assault on the land and soils by agricultural and horticultural chemicals is proving to be a major problem, causing imbalances in the amount of essential nutrients in those soils. Thus, the soils are often rendered unsuitable for economically sustained farming and at times the soils have been denatured such that normal levels of plant life cannot be supported. Furthermore, irrigation and rain water can leach applied fertilizers causing the eutrophication of lakes, rivers, and waterways, thus substantially contributing to water pollution. As the demand for increased production of foodstuffs and higher crop yields becomes greater, the pressure for wider application of chemical fertilizers becomes greater which often serves to exacerbate present levels of water pollution.

Our impact on the environment and sustainability of our soils and waterways are becoming important global issues. Governments are beginning to implement broad agricultural policies limiting the use of and at times banning chemical fertilizers, pesticides and weedicides. The leaching of chemical fertilizers has been shown to adversely effect native flora and fauna. Accumulation of phosphorous in waterways has supported the proliferation of undesirable aquatic plant growth such as blue-algae and has made conditions difficult for other plants, fish and marine organisms to survive in the highly acidified waterways.

The use of chemical fertilizers, fungicides and herbicides has paradoxically resulted in complex soil problems. The overuse of chemical fertilizers has rendered some soils toxic with unacceptably high levels of metals such as cadmium, mercury, lead, aluminium and the like, whilst also causing ionic lock-up through the use of synthetic ureas. The accumulation of aluminium salts and heavy metal salts has proven detrimental to fish and plant life. The leached nutrients assume such concentrations as to become toxic to fish and plant life and create considerable difficulties for producers who draw on poisoned water for irrigation requirements, as these toxic wastes are often growth inhibitors to many agricultural crops.

There is a need for environmentally friendly and acceptable soil improver compositions and fertilizers which are able to ameliorate soils by providing a natural source of NPK as well as other essential minerals and trace elements. It is desirable to create more favourable mediums for plant growth and to conserve soil by improving or increasing soil pH, water-holding capacity, water infiltration rates, aeration and temperature whilst being environmentally acceptable. It is also desirable to provide more or better alternatives to current soil treatments.

It is an object of the present invention to overcome or at least alleviate one or more of the above-mentioned disadvantages of the prior art.

SUMMARY OF THE INVENTION

Thus according to a first aspect of the present invention there is provided a soil improver composition produced by digesting a mixture comprising leguminous plant material, igneous rock powder of particle size less than 350 microns, a biodegradable surfactant and water with composting microbes to produce said soil improver composition. The composition may be regarded as a compost or mulch.

According to a second aspect of the present invention there is provided a soil improver composition produced by the steps comprising:

(a) digesting a mixture comprising leguminous plant material, igneous rock powder of particle size less than 350 microns, a biodegradable surfactant and water with composting microbes to produce a compost, and (b) treating the compost with an acidifying agent to release a liquid biomaterial produced by digestion from residual digestion products whereby the liquid biomaterial and the residual digestion products comprise the soil improver composition. The soil improver composition may be regarded as or formulated as a plant growth composition, and may also be used as potting mix, mulch or the like.

According to a third aspect of the present invention there is provided a soil improver composition comprising the liquid biomaterial produced in step (b) of the second aspect which is recovered from the residual digestion products. The liquid biomaterial is used as a soil improver composition as is, or may be further processed or formulated, and may be regarded as a plant growth composition, ameliorant, conditioner, fertilizer or the like.

According to a fourth aspect of the present invention there is provided a soil improver composition produced by the steps comprising:

(a) digesting a mixture comprising leguminous plant material, igneous rock powder of particle size less than 350 microns, a biodegradable surfactant and water with composting microbes to produce a compost, (b) treating the compost with an acidifying agent to release a liquid biomaterial produced by digestion from residual digestion products, (c) recovering the liquid biomaterial from the residual digestion products, and (d) adsorbing the liquid biomaterial on to a colloidal solid to produce loaded colloidal particles as the soil improver composition. The loaded colloidal particles so produced may be aggregated to give granules or prill, or the particles extruded or pressed into pellets.

According to a fifth aspect of the present invention there is provided a method for producing a soil improver composition comprising digesting a mixture comprising leguminous plant material, igneous rock powder of particle size less than 350 microns, a biodegradable surfactant and water with composting microbes to produce said soil improver composition. The composition may be regarded as a compost or mulch.

According to a sixth aspect of the present invention there is provided a method for producing a soil improver composition comprising the steps:

(a) digesting a mixture comprising leguminous plant material, igneous rock powder of particle size less than 350 microns, a biodegradable surfactant and water with composting microbes to produce a compost, (b) treating the compost with an acidifying agent to release a liquid biomaterial produced by digestion from residual digestion products, (c) recovering the liquid biomaterial from the residual digestion products, (d) adding an aqueous solution of acid digested igneous rock to the liquid biomaterial, and (e) adsorbing the liquid biomaterial on to a colloidal solid to produce loaded colloidal particles as the soil improver composition. The loaded colloidal particles so produced may be aggregated to give granules or prill, or the particles extruded or pressed into pellets.

Throughout this specification and the claims which follow, unless the text requires otherwise, the word "comprise", and variations such as "comprises" or "comprising", will be understood to imply the inclusion of a stated integer or step or group of integers or steps but not the exclusion of any other integer or step group of integers or steps.

The nature of the invention will now be further described by way of example only with reference to the following detailed description and scheme illustrated in the accompanying drawing.

BRIEF DESCRIPTION OF THE FIGURE

FIG. 1 exemplifies a method for producing a soil improver composition of the present invention. Step 1 is the preparation of a digestion stack. In step 1.1 a raw material diabase is prepared from harvested and chopped conditioned lucerne to which is optionally added fine brown coal dust and/or a clay based soil containing earthworms. At step 1.2 an igneous rock powder and surfactant composition comprising calcium metasilicate, gypsum, dolomite, igneous rock powder, an alkali metal hydroxide, a non-ionic surfactant and sulphur is added to the raw material diabase. At step 1.3 an inoculant culture medium is added to the raw material diabase saturated with the surfactant composition to make a first composting layer. Step 1.4 is the repeat of steps 1.1 to 1.3 as required until a stack of a desired height is obtained. Step 1.5 is the digestion of the inoculated raw material diabase which proceeds for up to 5 to 7 weeks or more until the internal temperature of the stack is ambient over 3 consecutive days. Product 1.5p is a soil improver composition, which may be regarded as a compost, made from the digested material from the stack. Step 2 is the extraction of a liquid biomaterial comprising humates from the digested stack. Extraction is best achieved by acidification with dilute organic acids at step 2.1 to release the humates, polymers, monomers and other biomaterials bound to the residual digestion products. Product 2.1p is another soil improver composition which may also be regarded as a compost, mulch, potting mix or the like. The liquid biomaterial containing humates is then separated from the residual digestion products at step 2.2 to give the liquid biomaterial. Product 2.2p represents further soil improver compositions comprising the liquid biomaterial or the recovered residual digestion products which compositions may also be regarded as plant growth improvers, potting mix or mulch. The residual digestion products may re-used in the digestion stack of step 1. At step 3 the separated liquid biomaterial containing humates is concentrated by evaporation or extraction of water, optionally with pH adjustment of the liquid to be compatible with ultimate end uses. At step 3ad acid digested igneous rock powder is optionally added to the liquid biomaterial prior to or during the concentration step. Product 3p is the recovery of the liquid biomaterial as a soil improver composition which may be used as is, or for the preparation of plant growth compositions, leaf sprays, fertilizers and the like. Step 4 is the loading of colloidal powder by spraying the liquid biomaterial onto the colloidal powder. End product 5p is the soil improver composition which may be regarded as an ameliorant, conditioner, or fertilizer. The soil improver composition may be further processed or formulated by aggregation of the loaded colloidal powder and/or integration of the loaded colloidal powder with further nutrients, plant growth agents, carriers, diluents and the like.

DETAILED DESCRIPTION OF THE INVENTION

Figure 1:
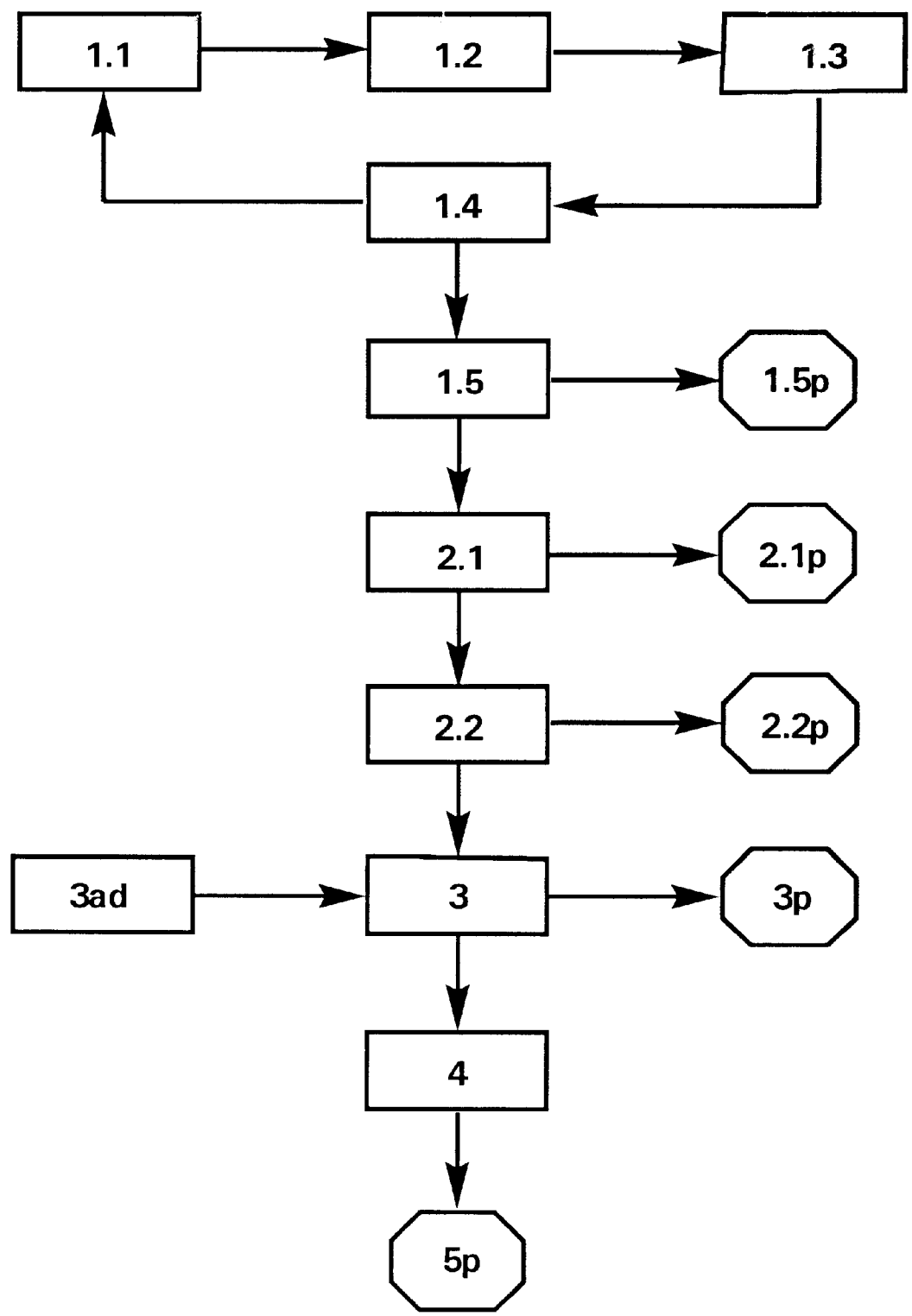

The soil improver compositions of the present invention show a remarkable ability to augment the growth of a wide variety of plants, to increase crop yields and to make some marginal lands productive. As used herein, an improver augments plant growth if its presence in the soil or application to the roots or leaves of the plants increases the viability, health, resistance to disease, size or rate of growth of the plant. The improvers of the present invention may also be used to augment crop yields and nutritional benefits of any growing crop such as cereal crops, fruit crops, vegetable crops, seed crops and grass crops where such crops include, but are not limited to wheat, barley, oat, soybean, rice, sugarcane, cotton, grapes, apple, tomato, orange, cherry, melon, strawberry, lettuce, potato, onion, turnip, peas, beans, carrot, zucchini, corn, tobacco, flowers, etc.

The improver compositions are able to increase the pH of acidic soils and can decrease the pH of basic or alkaline soils providing a more favourable environment for essential microbiological processes and plant growth. In particular, the soil improver composition is particularly useful for enabling tropical soils and other such often acidic soils to sustain a broader selection of plant species and crops. The compositions are also able to alleviate aluminum toxicity and increase the amount of exchangeable calcium, magnesium and potassium available to plants.

The composition can also increase phosphate immobilisation and thereby increase phosphorous availability to plants. The improver composition of the present invention provides a more environmentally responsible form of soil ameliorant and conditioner with low leachability than many of the chemical conditioners and chemical fertilizers presently available. The present improver composition is a composite of rich material, organic acids, colloids and mineralised phosphates. The rich material and organic acids are derived from an extract of the decomposition products of organic matter.

Organic matter is digested by composting microbes to produce a digestion product of the present invention. Preferably the organic matter to be digested is leguminous plant material, such as plant material from peas, beans, or clover. However it will be understood that the leguminous material may be substituted partly by straw or other grasses or even other organic matter in the methods of the invention to afford a useful soil improver composition provided there is protein-based matter available for digestion. When leguminous material is utilised it is preferably forage harvested (chopped into small pieces) at the beginning of the flowering season as the plant then has peak moisture content. The leguminous material should also preferably be conditioned by drying and rolling prior to digestion. The quality of the improver composition often decreases if harvesting of the leguminous material occurs before the flowering stage or during or after the vegetative stage.

Plants obtain the majority of their minerals and nutrients from the soil in which they grow. There is a symbiotic interchange of nutrients between the soil and the roots of the plants in the region of the rhizosphere zone. The rhizosphere zone is the tip of the root zone where microbial activity is unusually high, more so than in any other part of the plant roots. Plant roots excrete significantly high amounts of sugars in the form of polysaccharides, amino acids, polypeptides and vitamins in the rhizosphere zone and thus attract and promote extensive growth of bacteria and fungi in this area. In this association the bacteria and fungi benefit by receiving carbon compounds from the plant and in turn supply the plant with mineral nutrients metabolised from rock phosphates. The digestion products of the bacteria and fungi also provides a valuable liquid carbon-available source of lignin. The fungi can be found in micro-colonies around the rhizosphere due to the interchange of minerals and nutrients with the plant at this region. Likewise, bacterial activity benefits the plant by promoting the absorption through a diversity of metabolising enzymes produced by both fungi and bacteria. The diversity of these bacterial and fungal micro-organisms is variable and is dependent upon many factors such as plant type, region, soil fertility, water retention and pH.

The composting microbes are selected from one or more of bacteria, fungi, yeasts and other such organisms. The bacteria and other microbes suitable for use are nitrogen-fixing, carbon decomposting, phosphorous decomposting, potassium decomposting or yeast growth factor producers commonly known to those skilled in the art. The bacteria for use in the digestion step is preferably selected from one of more natural phospholytic bacteria, nitrogen-fixing bacteria, anaerobic and aerobic bacteria and thermolitic bacteria. Decomposition of the digestion mixture can be maintained by the thermolytic bacteria which stabilises the heat or temperature of the mixture. The bacteria together with the fungi are able to draw minerals from the composting organic matter to help form the biomaterial. Desirably the bacteria are thermolytic bacteria and gram negative bacteria. The products of digestion include polymer and monomer decomposition products exuded from the microbes and which are beneficial to healthy plant physiology. Bacteria suitable for use in the present invention preferably are selected from one or more genera of Azotobacter, Bacilla, Pseudomonas and Chaetomium, in addition to specific bacteria such as *Gloeophyllum trabeum, Lentinus iepideus* and *trametes, Merulius tremellosus, Perenniponia tephropora, Rigidoporus ulmarius, P. chrysosporium, M. tremellosus, P. tephropora* and *Streptomyces selonii*. A source of suitable bacteria and microbes is Aminite C-100 available from Cleveland Biotech, 1 Douglas Close, Preston Farm Business Park, Stockton on Tees, Cleveland Ohio.

Fungi used in the present invention are preferably one or more of white rot fungi and brown rot fungi. The fungi scavenges phosphorus and strips nutrients from the digesting organic matter. The fungi are believed to concentrate micro-nutrients as they digest the plant matter and helps form the biomaterial. Examples of fungi which may be used in the invention include DFP strains of wood rot fungi obtainable from the CSIRO Division of Chemical and Wood Technology, P.O. Box 56, Highett, Victoria 3190 Australia; FPRL strains obtainable from the Building Research Establishment, Princes Risborough Laboratory, Aylesbury, Bucks, U.K.; and ATCC strains obtainable from the American Type Culture Collection, 12301 Parklawn Drive, Rockville Md. 20852. Examples of white rot fungi include *Ganoderna applantum* (DFP 12073), *Merulius tremellosus* (FPRL 13), *Perenniporia tephropora* (FPRL 293A), *Phanerochaete chrysosporium* (ATCC 24725), *Pycnporus cinnabarius* (FPRL 176), *Rigidoporus ulmarius* (FPRL 241D), *Trametes versicolor* (ATCC 12679) and *Neurospora Crassa*, and particular mention is made of the *Phanerochaete chrysosporium* strain ATCC 24725. Examples of brown-rot fungi include *Gloeophyllum trabeum* (DFP 7550) and *Lentius lepideus* (DFP 2385).

Yeasts and moulds will naturally be present in the digestion mixture without the need to specifically add them. However, it is often useful to add yeast in the form of brewers yeast to the digestion mixture to assist in the composting of the plant material. If yeasts are added to the digestion mixture, it is advisable to add molasses or other saccharides to assist in sustaining these microorganisms.

Coal may optionally be added to the decomposition mixture to provide a valuable source of lignin to the improver composition. Preferably the coal is brown coal which is high in lignin content. Desirably the coal is low in pyrites and is powdered, preferably to a particle size of 75–125 microns. Lignin may also be added to supplement or in place of coal.

The surfactant used in the present invention is preferably non-ionic, more preferably a long chain fatty acid ester such as coconut oil or palm oil where in the base alcohol is generally a polyol such as glycerol or the like. It is highly preferred that the surfactant is biodegradable and does not leave any appreciable residue in the soil. The surfactant may also be consumed as a growing medium, or as a food for the microbes and as a wetting agent. The surfactant of choice is liquid oxidised coconut oil such as LOC obtainable from Amway Corporation.

Preferably the igneous rock is a phosphate rock composite, which contains a high percentage of phosphorous. The improver composition of the present invention utilises very fine particle size phosphate rock which allows ready availability of the phosphorous to the plant. Being a very fine dust form, organisms in the soil such as earthworms and microorganisms are able to bring the finely ground phosphate rock into contact and interaction with the plants roots. Rock particles which are sufficiently small such as those less than 350 microns are able to release phosphatic material useful for strong plant growth. Igneous rock particles larger than 350 microns are generally not important to the present compositions. Preferably the rock particles are less than 250 microns and more preferably a substantial amount are less than 175 microns. Preferably 60% of the rock particles are less than 40 microns and more preferably from 1 to 20 microns, and most preferably around 4 microns.

A variation or range of particle size of igneous rock is also particularly preferred. Without wishing to be limited to theory it is believed that the various sized particles disperse and make a lattice in the soil. The lattice has an ability to pull in other solutes for use by the roots of the plants. Particles in the range of 150–250 microns are thought to act as stratifying agents which are able to regulate the release of nutrients. Those particles below 40 microns are believed to control the release of nutrients within the soil. Rock particle sizes generally refer to the diameter of the particle. The powdered rock may be prepared by any suitable means such as by ball mill or rod mill mechanical crushing.

The igneous rock as used in the present invention may be readily sourced from most quarries and is preferably serpentine basaltic rock or serpentine pumice, more preferably a finer grain serpentine basaltic rock. Other types of phosphate containing and calcium-rich rock may be used to augment or supplement the igneous rock.

Whilst granite may be used as an igneous rock in the present invention, it is sometimes not favoured as it may contain unacceptable amounts of radioactive material or heavy metals such as cadmium to allow importation of the improver composition containing such rock into some countries, and possible contamination of treated land and waterways.

A problem with some soils is that they are unable to hold superphosphates in situ. It is believed that the improver composition of the present invention is able to not only release some chemically bound phosphates held in soil particles but also sequents further phosphate fixation.

The igneous rock powder is important to the improver composition as it is also a source of organic phosphorous. The rock powder may also comprise colloidal clays, sand, mineralised colloidal silt, sludge (sewerage) or other colloidal silicates obtained from mineral wastes and swamp slurry. The rock powder also preferably contains or has added calcium metasilicates.

The acid digested igneous rock may be prepared by known methods in the art which usually comprises forming a slurry of igneous rock preferably powdered rock of less than 350 microns and more preferably less than 175 microns dissolved in acid. Typically mineral acids may be used to digest the rock, such acids include nitric acid, phosphoric acid, sulfuric acid and hydrochloric acid, preferably nitric acid or hydrochloric acid. The acid digested igneous rock is added to the liquid biomaterial produced by digestion to prepare the soil improver of the present invention. The acid digested igneous rock is used as an add-on agent to the liquid biopolymer to increase the volume of readily available or soluble nutrients and minerals such as calcium metasilicate.

The addition of the liquid digested igneous rock to the liquid biomaterial is optional, however advantageous as it provides a ready source of phosphates and nutrients to the plants. Soil improver compositions of the present invention without the acid digested igneous rock added are slower to release phosphates and other nutrients to the plants.

In one embodiment of the present invention, igneous rock powder is not added to the digestion mixture but rather is only added to the liquid biomaterial extract as an acid-digested igneous rock powder. This embodiment removes the need for the microbes to degrade the rock powder added to the digestion mixture however, improver compositions prepared without igneous rock powder in the digestion mixture produced products with less readily-available nutrients compared to those products produced with igneous rock powder in the digestion mixture. Accordingly it is highly preferred that the igneous rock powder is in fact included in the initial digestion step to give an extended product. Pre-digesting the rock powder makes nutrients and minerals immediately available to the plants and continued digestion of the remaining rock powder assists in giving an extended supply of nutrients and minerals. Pre-digesting the rock also assists in making the nutrients available to the plants more quickly.

The digestion of organic plant material by microbes is well known in the art and well documented. Digestion of the leguminous compositions of the present invention may involve almost any method including digestion in an open stack, closed stack, as a mixture or layer of materials, in a pit, chamber, tank, drum or the like. The methods described herein use a stack built up from one or more successive layers of plant material, igneous rock powder, surfactant and composting microbes, however it will be understood that in general any suitable digestion or composting method may be employed. Worms can be added or introduced to help spread material in the mixture and to help digestion, and most readily may be introduced in the soil or organic matter in which they are living. The stack may be covered as in silage production. The stack may also be turned either manually or mechanically.

The pH, water content and temperature of the stack is monitored during the digestion process and additional potassium hydroxide solution, water or other agents may be added if required according to standard and well known methods in the art. Typically the stack increases in temperature to 55–60° C. or more during digestion. Decomposition of the stack is complete after the stack reaches ambient temperature over three consecutive days. The decomposed material makes an excellent sol improver composition which may be regarded as compost.

After the biomass has digested for a time the ingredients form a sludge known as extendable humates or liquid biomaterial which can be separated from the larger residual digestion products. The digested product is able to pass through a sieve and the fibrous solid caught in the sieve can be recycled into a new stack for further digestion or used elsewhere such as in potting mix or mulch. The finer particulate sludge which passes through the sieve can the be acid treated to release the liquid biomaterial.

Most acids are suitable for use in acidifying the digestion product, and typically the better acids are organic acids such as carbonic acid, acetic acid and citric acid. Carbonic acid may be added to the digestion product as an aqueous liquid or by applying gaseous carbon dioxide to moist digestion product to form carbonic acid in situ. Other acids such as acetic acid or citric acid are applied as aqueous solutions. It is estimated that only 10–20% of nutrients can be separated from the bulk of the digestion product without the acid treatment. The acid is believe to strip the concentrated micronutrients and biomaterials from the fibrous solids. The liquid biomaterial may be recovered by any suitable process such as for example filtration, hydraulic pressing or centrifugation. It is also believed that many heavy metal complex contaminants are able to be retained in the residual digestion product. It is also postulated that the fungi are able to trap heavy metals and hold them in the residual digestion product during separation of the liquid biomaterials. The liquid biomaterial so formed is generally mucosal or micellular.

The separated liquid biomaterial can be concentrated and usually requires pH adjustment to a pH typically of 5.2–7.2 before being further processed or used as a soil improver composition or plant growth composition. This is generally referred to as "toning". Concentration can assist in the adsorption of the liquid biomaterial onto colloidal solids and may be effected by standard methods such as vacuum extraction or evaporation of water to any desired concentration. In one embodiment the liquid is concentrated to 65–75% v/w of liquid to solids, however this can vary significantly depending on the intended use or properties of the concentrated liquid biomaterial. The concentrated liquid biomaterial may be subjected to pH adjustment depending on the ultimate use of the improver compositions, soil to be treated, plants to which it is applied or crops to be grown. The pH adjustment may be necessary to maximise growth and to ensure that plants flourish. The actual pH range required varies significantly between different applications of soils to be treated and plants or crops to be grown. At the concentration stage further micronutrients, minerals, acid digested igneous rock powder, extenders, surfactants, adhesives, colouring agents and the like may be added.

The liquid biomaterial may be adsorbed onto particulate rock including igneous rock, and any other suitable support such as crystals, salts, beads, biodegradable polymers, and other solid soil ameliorants or fertilizers, or it may be used as a liquid on its own. Other suitable supports are inorganic colloids including clay particles, bentonite, kaolin and zeolite. Concentration of the liquid biomaterial by evaporation or water extraction is often necessary and it may also be necessary to adjust the pH of the biomaterial during or after concentration of the liquid as discussed above. Ideally the biomaterial is sprayed on to the colloidal particles. An adhesive or other agent such as a gossamer or grape seed oil may be used to assist the liquid biomaterial being adsorbed onto the support. Without wishing to be limited to theory, it is believed that the liquid biomaterial is adsorbed on to the surface of the colloidal particle by the normal surface tension forces of the liquid and the liquid is thought to be strongly held by electrostatic forces and/or hydrogen bonding. The colloidal particles are able to hold nutrients and release them slowly to their surroundings perhaps due to weathering, making the nutrients available to the plants over an extended period of time.

It is sometimes preferred that the microbes are killed at some time after digestion. This makes the digestion mixture sterile and reduces the amount of foreign matter added to soil during treatment with the soil improvers of the invention. Primarily sterilisation is preformed to overcome or avoid possible quarantine restrictions or other statutory rules on transport or importation of the digested products. Ultra violet rays, heat or any other suitable treatment may be used to kill the microbes.

The soil improver compositions, also known as plant growth compositions, potting mixes and mulches, of the present invention optionally have added soil such as clay-based soils, sand, minerals, nutrients, auxins, plant growth agents, manure and manure products, blood and bone, diluents, carriers, extenders, gelling agents, thickeners, or other such compounds and compositions in the formulation of soil improver and plant growth products. The physical state of the products may also be altered to suit intended transport and storage requirements and physical applications.

The soil improver composition may be applied to plant foliage such as by a spray, plant roots such as a dipping agent, or the soil in which plants are growing or are to be sown. In one form, the improver composition may be granulised by spraying with an aqueous based dust surfactant and allowing the improver composition to run down a drying race to bind and form a conglomerate or granule. This type of process is commonly used in the superphosphate industry. The granulised soil improver composition is more suitable for application to large tracks of land by machinery or aeroplane. The improver granules once wetted by irrigation or rain readily break down and infiltrate the soil to provide nutrients to growing plants. The plant growth compositions and soil improvers of the present invention may also be applied as a solution, suspension or gel. Suitable solvent, extenders, gelling agents and diluents known to those skilled in the art may be employed in formulating the soil improver compositions.

The improver compositions of the present invention provide a broad spectrum pool of available nutrients over time which assists in strong and healthy plant growth and can build systemic resistance to disease. The soil improver compositions are able to provide beneficial amounts of available nitrogen, phosphorous and potassium (NPK) to plants.

Tropical soils often have a high acidification factor typically due to strong hydrogen bonding in the soil. Addition of sedimentary type soils can help break hydrogen fixing. Acidic soils can also be quenched with igneous rock material as the material increases the pH of the soil and so can provide a sound basis for regeneration of acid fixed soils. It is believed that the igneous rock material may block oxidation in the soil and help prevent soil acidity from increasing.

It is particularly advantageous to co-apply either simultaneously or sequentially the soil improver of the present invention with for example superphosphate, or other soil conditioners, micronutrients, animal manure or other agents usually employed in the art. It is also possible to co-granulate, incorporate, coat or encase the improver composition with superphosphate, manure, micronutrients, minerals and other such agents and additives incorporated to further improve the soil conditioning properties of the composition, to make the composition more specific for particular uses and to make a predetermined fertilizer.

In order to facilitate a better understanding of the invention, reference will be made to the following examples which describe preferred embodiments of the invention.

EXAMPLE 1

Soil Improver Composition

Step 1—Preparation of Digestion Product 1.1 Raw material diabase

Harvested, chopped, dried and rolled lucerne (1 tonne) was spread in a 3 meter wide windrow to a thickness of about 15 cm.

On top of the lucerne layer was spread a clay based soil (100 kg) containing earthworms.

1.2 Igneous rock and surfactant composition

The lucerne and soil layer was saturated with a surfactant composition comprising:

| | |
|---|---|
| 200 kg | calcium metasilicate (size, 4–75 microns) |
| 20 kg | gypsum (limestone may be substituted if preferred or if gypsum is not readily available) |
| 100 kg | dolomite |
| 50 kg | igneous rock powder (particle size, 4–75 microns) |
| 50 kg | potassium hydroxide |
| 25 ml | liquid oxidised coconut oil, and |
| 2 kg | sulphur | mixed as a solution/suspension in up to 2000 liters of water.

1.3 Bacterial and Fungal Inoculation

The stack was sprayed with inoculant culture mediums of bacteria and fungi. Bacterial inoculation was performed with a solution (20 liters) of Aminite C-100 (5 g) sourced from Cleveland Biotech, 1 Douglas Close, Preston Farm Business Park, Stockton on Tees, Cleveland Ohio TS1835B. The C-100 culture medium contains up to 101 strains of microbes and bacteria including strains belonging to Azotobacter, Bacilla, Pseudomonas and Chaetomium genera. Fungal inoculation is performed with a solution (20 liters) of white rot fungus *Phanerochaete chrysosporium* strain ATCC 24725 (1 g). The inoculant solutions are prepared according to culture notes supplied with the microbes.

1.4 Layered Repeat

Steps 1.1 to 1.3 were repeated about 15 times until the stack was about 2.5 meters high. Steps 1.1 to 1.3 are repeated 10–20 times, or until the stack is of a desired height, typically 2 to 6 meters high.

1.5 Natural digestion

The stack was then covered to prevent oversaturation with water due to excessive rain or dehydration through evaporation of water. Typically the stack is sealed as in silage production. The stack was left untouched as digestion of the organic matter commenced. As the digestion progressed, the internal temperature of the stack increased to about 55–60° C. Sometimes the internal temperature may increase up to about 80° C. or more. Cool air may be blown through the stack to dissipate heat if thought necessary. If the temperature of the stack does not increase it may be necessary to re-inoculate the stack.

After 2 weeks, the temperature, pH and water concentration of the stack were monitored daily. It is possible to adjust the pH by adding more aqueous potassium (or sodium) hydroxide if necessary. After 7 weeks, (typically 4–8 weeks or more) the stack was known to have digested to compost due to the internal temperature of the stack stabilizing as evidenced by 3 readings of ambient temperature obtained over 3 consecutive days.

1.5p: Soil Improver Composition

Some of the decomposition product of step 1.5 was sifted to constitute a soil improver composition which may be regarded as a compost or mulch.

Step 2—Acidification

2.1 pH Adjustor

The disassociation of liquid biomaterial containing humates from residual decomposition product was encouraged with a pH band in the range 3.2 to 5.2. This was achieved by acidifying the digested material from step 1.5 with aqueous citric acid. A solution of citric acid diluted to 20 kg/1,000 liters of water was sprayed on the digested leguminous material to the point of saturation. The volume of solution required can vary greatly from batch to batch, and depends on the moisture content and absorption rate of the digested material. The pH adjusted soil improver composition was found to be excellent for use as a compost and potting mix.

2.2 Liquid Biomaterial Separation

The digested legume material was now hydraulically pressed to give the liquid biomaterial (also known as the "humate solution"). It is also possible to subject the digested material to a centrifugal extraction process or other effective method known in the art. The liquid biomaterial contained humates, polymers and monomers and was found to be efficient for good, strong and healthy plant growth.

2.1p and 2.2p: Soil Improver Composition

The pH adjusted, digested legume material of step 2.1 and the residual digestion product of step 2.2 each were sifted to form soil improver compositions of the present invention and were found to be excellent for use as a potting mix, mulch and the like.

Step 3—Concentration

3 The volume of the separated humate solution was greatly reduced by vacuum extraction of water and was pH adjusted to within the range 5.2 to 7.2. Further volume reduction, pH adjustment or potassium intensification may be made to the solution as required. The amount of volume reduction largely depends on whether the solution is to be transported, stored, or used in later processing and formulation steps.

3p The concentrated humate solution is another soil improver composition of the present invention and was found to be excellent for use in plant growth compositions, leaf sprays and fertilizers after being formulated.

Step 4—Integration

4 Colloidal particles in fine powder form were transported across a conveyer belt whilst the concentrated humate solution was sprayed over the colloidal particles (igneous rock powder of particle size less than 350 microns, typically 2–75 microns) according to standard procedures well known in the art. The humate solution adsorbed on to the colloidal powder and any excess moisture was dried off at ambient to low temperatures.

Step 5—Product: Soil Improver Composition

5 The integrated dry end-product from step 4 was found to be excellent for use as a soil improver, ameliorant and conditioner. Some loaded colloidal powder from step 4 was aggregated with grape seed oil as an aggregation adhesive agent according to well known methods in the art. It is also possible to extrude the loaded colloidal powder as a pellet or microencapsulate the loaded colloid if desired. Further nutrients, auxins, plant growth agents, carriers, diluents and the like may also be incorporated into the prill, pellets, microcapsules or the like if required.

EXAMPLE 2
Lignin-Rich Soil Improver Composition

The method of Example 1 was followed except that the stack was built only with the raw diabase of step 1.1 saturated with the surfactant composition of step 1.2 and repeated (step 1.4) until the stack was of desired height (2 meters). The stack was then inoculated only once with the inoculation mixture of step 1.3. The soil improver products produced by this method were found to be excellent for use as compost, potting mix, plant growth compositions, soil improvers, ameliorants and conditioners, and fertilizers.

EXAMPLE 3
Lignin-Rich Soil Improver Composition

The method of Example 1 was followed except that to the raw material diabase of step 1.1, a layer of fine brown coal, low in pyrites and preferably of particle size 75–125 microns (100 kg), was evenly spread on the lucerne and soil layer prior to saturation with the surfactant composition of step 1.2 and inoculation mixture of step 1.3. The soil improver products produced by the method were lignin-rich and were found to be excellent for use as compost, potting mix, plant growth compositions, soil improvers, amielorants and conditioners, and fertilizers.

EXAMPLE 4
Acid Digested Igneous Rock Soil Improver Composition

The method of Example 3 was followed except that as new step 3ad an aqueous solution of acid digested igneous rock powder (3 parts) was added to the separated humate solution (1 part) of step 3 prior to concentration. The soil improver products produced by this method were found to be excellent for use as plant growth compositions, soil improvers, ameliorants and conditioners, and fertilizers.

Those skilled in the art will appreciate that the invention described herein is susceptible to variations and modifications other than those specifically described. It is to be understood that the invention includes all such variations and modifications. The inventions also includes all of the steps, features, compositions and compounds referred to or indicated in the specification, individually or collectively, and any and all combinations of any two or more of said steps or features.

I claim:

1. A soil improver composition produced by digesting a mixture comprising leguminous plant material, igneous rock powder of particle size less than 350 microns, a biodegradable surfactant and water with composting microbes to produce said soil improver composition.

2. The soil improver composition of claim 1, wherein the igneous rock powder is of particle size less than 175 microns.

3. The soil improver composition of claim 1, wherein the surfactant is a non-ionic surfactant.

4. The soil improver composition of claim 1, wherein the mixture to be digested further comprises fine brown coal powder, calcium metasilicate, gypsum, dolomite, potassium hydroxide, sulphur, or a combination thereof.

5. The composition of claim 4, wherein said composition does not contain heavy metal salts or synthetic ureas.

6. A soil improver composition produced by the steps comprising:
   (a) digesting a mixture comprising leguminous plant material, igneous rock powder of particle size less than 350 microns, a biodegradable surfactant and water with composting microbes to produce a compost, and
   (b) treating the compost with an acidifying agent to release a liquid biomaterial produced by digestion from residual digestion products in the preparation of the soil improver composition.

7. The soil improver composition of claim 6, wherein the acidifying agent is aqueous citric acid or carbonic acid.

8. The soil improver composition of claim 6, wherein the composition further comprises clay-based soil, sand, minerals, plant growth agents, auxins, nutrients, manure or manure products, blood and bone, or a combination thereof.

9. The soil improver composition of claim 6, which composition comprises the liquid biomaterial recovered from the residual digestion products.

10. The soil improver composition of claim 9, wherein the liquid biomaterial is recovered by filtration, hydraulic pressing or centrifugation.

11. The soil improver composition of claim 9, wherein the composition further comprises clay-based soil, sand, minerals, nutrients, plant growth agents, auxins, manure or manure products, blood and bone, diluents, carriers, extenders, gelling agents, thickeners, or a combination thereof.

12. A soil improver composition produced by the steps comprising:
   (a) digesting a mixture comprising leguminous plant material, igneous rock powder of particle size less than 350 microns, a biodegradable surfactant and water with composting microbes to produce a compost,
   (b) treating the compost with an acidifying agent to release a liquid biomaterial produced by digestion from residual digestion products,
   (c) recovering the liquid biomaterial from the residual digestion products,
   (d) adsorbing the liquid biomaterial on to a colloidal solid to produce loaded colloidal particles as the soil improver composition.

13. The soil improver composition of claim 12, wherein the colloidal solid is igneous rock powder, zeolite or kaolin having a particle size less than 350 microns.

14. The soil improver composition of claim 12, wherein an aqueous solution of acid digested igneous rock is added to the recovered liquid biomaterial prior to adsorption on to the colloidal solid.

15. The soil improver composition of claim 14, wherein the igneous rock is digested with nitric acid or hydrochloric acid.

16. The soil improver composition of claim 12, wherein the loaded colloidal particles further comprise at least one member selected from the group consisting of aggregating agents, extrusion agents, fillers, colouring agents, clay-based soil, sand, minerals, nutrients, auxins, plant growth agents, manure or manure products, blood and bone, diluents carriers, extenders, gelling agents, and thickeners, and the loaded colloidal particles are then aggregated as granules or prill, or the particles are extruded as pellets.

17. A method for producing a soil improver composition comprising digesting a mixture comprising leguminous plant material, igneous rock powder of particle size less than 350 microns, a biodegradable surfactant and water with composting microbes to produce said soil improver composition.

18. The method of claim 17, wherein the mixture to be digested further comprises fine brown coal powder, calcium metasilicate, gypsum, dolomite, potassium hydroxide, sulphur, or a combination thereof.

19. A method for producing a soil improver composition comprising the steps:
   (a) digesting a mixture comprising leguminous plant material, igneous rock powder of particle size less than 350 microns, a biodegradable surfactant and water with composting microbes to produce a compost,
   (b) treating the compost with an acidifying agent to release a liquid biomaterial produced by digestion from residual digestion products,
   (c) recovering the liquid biomaterial from the residual digestion products,
   (d) adding an aqueous solution of acid digested igneous rock to the liquid biomaterial, and
   (e) adsorbing the liquid biomaterial on to a colloidal solid to produce loaded colloidal particles as the soil improver composition.

20. The method of claim 19, wherein the mixture to be digested further comprises fine brown coal powder, calcium metasilicate, gypsum, dolomite, potassium hydroxide, sulphur, or a combination thereof.

21. The method of claim 19, wherein the colloidal solid is igneous rock powder, zeolite or kaolin having a particle size less that 350 microns.

22. The method of claim 19, wherein the igneous rock is digested with nitric acid or hydrochloric acid.

23. The method of claim 19, wherein the loaded colloidal particles further comprise at least one member selected from the group consisting of aggregating agents, extrusion agents, fillers, colouring agents, clay-based soil, sand, minerals, nutrients, auxins, plant growth agents, manure or manure products, blood and bone, diluents carriers, extenders, gelling agents, and thickeners, and the loaded colloidal particles are then aggregated as granules or prill, or the particles are extruded as pellets.

24. The method according to claim 19, wherein said composting microbes are selected from the group consisting of bacteria, fungi, yeast, and mixtures thereof.

25. The method according to claim 19, wherein said bacteria is a thermolytic bacteria or a gram-negative bacteria.

26. The method according to claim 25, wherein said thermolytic bacteria stabilize the heat or temperature of said digestion mixture from about 55° C. or more.

27. The method of claim 19, wherein said soil improver composition is subsequently sterilized by killing said microbes.

28. The method of claim 19, wherein said leguminous plant material is selected from the group consisting of peas, beans, and clover.

29. The method of claim 19, wherein said leguminous plant material is stacked from one or more successive layers of said plant material, said igneous rock powder, said surfactant, and said composting microbes.

* * * * *